United States Patent [19]

Niwa et al.

[11] Patent Number: 4,704,438

[45] Date of Patent: Nov. 3, 1987

[54] NOVEL STYRENE COPOLYMER

[75] Inventors: Tadashi Niwa; Masayuki Kato; Yoshio Taguchi, all of Saitama; Chihiro Imai, Yokohama, all of Japan

[73] Assignee: Toa Nenryo Kogyo Kabushiki Kaisha, Tokyo, Japan

[21] Appl. No.: 35,022

[22] Filed: Apr. 6, 1987

[30] Foreign Application Priority Data

Apr. 18, 1986 [JP] Japan ................... 61-88234

[51] Int. Cl.$^4$ ............................................. C08F 8/00
[52] U.S. Cl. ................... 525/333.3; 525/342; 526/279
[58] Field of Search .............. 526/279; 525/333.3, 525/342

[56] References Cited

U.S. PATENT DOCUMENTS 2,642,415  6/1953  Winslow ........................ 526/279

Primary Examiner—Paul R. Michl
Attorney, Agent, or Firm—Wenderoth, Lind & Ponack

[57] ABSTRACT

A novel styrene copolymer having a functional group, i.e. silyl group on the para-position of the aromatic ring, useful as a functional polymer, is provided. An effective process for the production thereof comprises contacting a random or block copolymer of p-methylstyrene and α-methylstyrene with an organolithium compound to lithiate partly the p-methyl group in the copolymer and then reacting the lithiated copolymer with a silicon compound represented by the general formula $(R^1)(R^2)(R^3)SiX$ wherein $R^1$, $R^2$ and $R^3$ are, same or different, alkyl groups with 1 to 6 carbon atoms or alkenyl groups with 2 to 6 carbon atoms, at least one of $R^1$, $R^2$ and $R^3$ being an alkenyl group, and X is a halogen atom.

16 Claims, No Drawings

NOVEL STYRENE COPOLYMER

BACKGROUND OF THE INVENTION

1. Field of the Invention

This invention relates to a styrene copolymer having silyl groups.

2. Description of the Prior Art

Styrene polymers having substituents, in particular, functional groups are useful as a functional polymer. Up to the present time, styrene polymers having functional groups have often been produced by copolymerizing styrene compounds with unsaturated monomers having functional groups or by reacting styrene polymers with saturated or unsaturated compounds having functional groups. For the production of high molecular ionic materials or high molecular chelate materials, for example, there are employed methods comprising reacting styrene polymers with halomethyl ethers to introduce the halomethyl groups into the aromatic rings of the styrene polymers and further reacting with compounds having other functional groups to introduce the desired functional groups.

However, these methods are effective for the purpose of imparting functional groups to styrene polymers, but it is difficult to selectively introduce a functional group into a specified position of the aromatic ring of a styrene polymer by these methods and the variety of functional groups to be introduced are limited.

"Journal of Organic Chemistry" Vol. 41, No. 24, page 3877 (1976) describes a method comprising subjecting a cross-linked polystyrene to lithiation with n-butyllithium and then reacting with various reagents to introduce substituents into the aromatic rings, in which the lithiation takes place at both the meta- and para-positions of the aromatic ring in a m-/p- ratio of 2/1. In this case, the reaction needs heating and proceeds with a lithiation efficiency of only about 23%. Furthermore, the above described reference describes another method comprising brominating a cross-linked polystyrene in the presence of a thallium (III) salt, reacting with n-butyllithium in the same manner as described above and then reacting with reagents in the same manner as described above to introduce substituents into the para-position of the aromatic rings.

In the prior art method as described above, it is difficult to introduce a substituent selectively and effectively into a specified position of the aromatic ring, in particular, the para-position thereof and complicated procedures are required.

SUMMARY OF THE INVENTION

It is an object of the present invention to provide a styrene copolymer having silyl group at the paraposition of the aromatic ring.

It is another object of the present invention to provide a styrene type copolymer with an excellent heat resistance as well as a high solubility in organic solvents.

These objects can be attained by a styrene copolymer comprising, in combination, the following recurring units (A), (B) and (C),

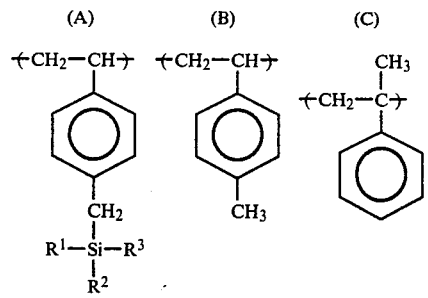

wherein $R^1$, $R^2$ and $R^3$ are same or different alkyl groups having 1 to 6 carbon atoms or alkenyl groups having 2 to 6 carbon atoms, at least one of $R^1$, $R^2$ and $R^3$ being an alkenyl group, and the proportions of the recurring units (A), (B) and (C) are respectively 1 to 70 mol %, 1 to 97 mol % and 2 to 98 mol %.

DETAILED DESCRIPTION OF THE INVENTION

The inventors have made various efforts to develop a styrene polymer having a functional group, useful as a functional polymer, and consequently, have found that a styrene copolymer having silyl group on the para-position of the aromatic ring can be obtained by reacting a copolymer of p-methylstyrene and α-methylstyrene with an organolithium compound to lithiate selectively the p-methyl group in the copolymer and then reacting with a silicon compound. The present invention is based on this finding.

Accordingly, the present invention provides a styrene copolymer consisting of a linkage of the following recurring units (A), (B) and (C),

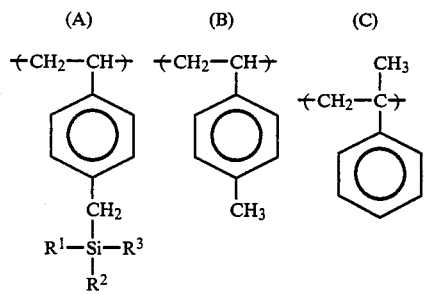

wherein $R^1$, $R^2$ and $R^3$ are, same or different, alkyl groups having 1 to 6 carbon atoms or alkenyl groups having 2 to 6 carbon atoms, at least one of $R^1$, $R^2$ and $R^3$ being an alkenyl group, and the proportions of the recurring units are respectively (A) 1 to 70 mol %, (B) 1 to 97 mol % and (C) 2 to 98 mol %.

The styrene copolymer of the present invention consists of a random linkage of the above described recurring units (A), (B) and (C), or a random linkage part of the recurring units (A) and (B) and a blocked linkage part of the recurring unit (C). Random copolymers of (A), (B) and (C) are preferable. The styrene copolymer of the present invention comprises 1 to 70 mol % of (A), 1 to 97 mol % of (B) and 2 to 98 mol % of (C), preferably 5 to 50 mol % of (A), 5 to 40 mol % of (B) and 20 to 80 mol % of (C).

This styrene copolymer generally has a weight average molecular weight of several thousands to several millions and a molecular weight distribution of weight average molecular weight ($\overline{Mw}$)/number average molecular weight ($\overline{Mn}$) of at most 2.0. Particularly, $\overline{Mw}$ is preferably ten thousands to five hundred thousands and $\overline{Mw}/\overline{Mn}$ is preferably 1.0 to 1.5.

PREPARATION OF STYRENE COPOLYMERS

The styrene copolymer of the present invention can be prepared by bringing a random or block copolymer of p-methylstyrene (hereinafter referred to as PMS) and α-methylstyrene (hereinafter referred to as αMS), which will hereinafter be referred to as PMS copolymer, into contact with an organolithium compound to lithiate partly the para-methyl groups in PMS copolymer and then reacting with a silicon compound represented by the formula $(R^1)(R^2)(R^3)SiX$ wherein $R^1$, $R^2$ and $R^3$ are, same or different, alkyl groups with 1 to 6 carbon atoms or alkenyl groups with 2 to 6 carbon atoms, at least one of $R^1$, $R^2$ and $R^3$ being an alkenyl group, and X is a halogen atom.

The compounds used in the preparation of the styrene copolymer will be illustrated:

(1) PMS Copolymer

PMS copolymer can be prepared by subjecting PMS or αMS to random or block copolymerization by an ordinary radical polymerization or living polymerization method and in particular, the living polymerization method is preferable because of obtaining a copolymer having a narrower molecular weight distribution. When the recurring unit (B) is uniformly distributed in the styrene copolymer, the styrene copolymer of the present invention is more useful as a resist and from this standpoint, therefore, the random copolymerization method is preferable.

The living polymerization is carried out in the presence of an initiator capable of forming styryl anion, for example, an organolithium compound such as n-butyllithium or sec-butyllithium. Furthermore, the living polymerization can be carried out in the presence of a solvent. As the solvent, there can be used hydrocarbons such as hexane, heptane, octane, cyclohexane, benzene, toluene, xylene and the like, and ethers such as diethyl ether, dibutyl ether, tetrahydrofuran, dioxane and the like, which are inert to the initiator and anion resulting therefrom.

The living polymerization is generally carried out by reacting PMS and αMS at a temperature of −80° C. to +50° C. for 0.5 to 50 hours. The random copolymerization is carried out by simultaneously using PMS and αMS and the block copolymerization is carried out by firstly polymerizing one of PMS and αMS and then copolymerizing the other.

PMS and αMS are generally used with a PMS/αMS mole ratio of 2-98/98-2, preferably 25-75/75-25. Thus, a PMS copolymer having a weight average molecular weight of several thousands to several millions, preferably ten thousands to five hundred thousands, $\overline{Mw}/\overline{Mn}$ of at most 2.0, preferably 1.0 to 1.5 and PMS part/αMS part mole ratio of 2-98/98-2, preferably 25-75/75-25 is obtained.

(2) Organolithium Compound

The organolithium compound used for the lithiation of PMS copolymer is represented by the general formula RLi, for example, wherein R is an alkyl group with 1 to 12 carbon atoms, typical of which are methyllithium, ethyllithium, n-butyllithium, sec-butyllithium, tert-butyllithium, n-pentyllithium, tert-pentyllithium, hexyllithium, octyllithium, dodecyllithium and the like. Particularly, butyllithium is preferably used.

(3) Silicon Compound

The silicon compound is represented by the foregoing formula in which $R^1$, $R^2$ and $R^3$ are alkyl groups, preferably methyl, ethyl, n-propyl and n-butyl groups, more preferably methyl and ethyl groups, or $R^1$, $R^2$ and $R^3$ are alkenyl groups, preferably vinyl, allyl, propenyl, isopropenyl and butenyl groups, more preferably vinyl and allyl groups. X is preferably chlorine atom.

REACTION OF PMS COPOLYMER AND ORGANOLITHIUM COMPOUND

The reaction of PMS copolymer and an organolithium compound can be carried out in an inert solvent to the organolithium compound. Useful examples of the solvent are hydrocarbons such as hexane, heptane, octane, cyclohexane, benzene, toluene, xylene and the like, and ethers such as diethyl ether, dibutyl ether, tetrahydrofuran, dioxane and the like. PMS copolymer is dissolved in such a solvent or swelled with such a solvent and then reacted with an organolithium compound, during which a reagent capable of increasing the reactivity of the organolithium compound, for example, amines can be added. As the amine, N,N,N',N'-tetramethylethylenediamine is preferable.

The reaction temperature can freely be determined at from −70° C. to the boiling point of the solvent, but in order to achieve a higher lithiation efficiency in effective manner, a temperature of above room temperature is desired. The quantity of an organolithium compound to be used can suitably be determined depending on the units of p-methylstyrene present and the lithiation ratio can freely be controlled. The amine is favourably used in a quantity equivalent to the organolithium compound, but can of course be used in excess. The reaction time, depending upon the reaction temperature, is ordinarily 0.1 to 100 hours and the lithiation ratio can be increased by lengthening the reaction time.

Since the thus prepared lithiated PMS copolymer is so reactive that it reacts readily with the moisture in the air, it is preferable to use the copolymer for the subsequent reaction as it is without separation thereof.

Reaction of Lithiated PMS Copolymer and Silicon Compound

The reaction of the lithiated PMS copolymer with a silicon compound can be accomplished by directly adding the silicon compound to the reaction system of the preceding stage, in which there is the lithiated PMS copolymer. and thereby contacting them. The silicon compound is used in a molar proportion of ordinarily 1 to 100 times, preferably 1 to 10 times as much as the organolithium compound used in the preceding stage. The reaction is carried out at a temperature of −50° C. to +150° C., preferably 0° to 50° C. for 0.1 to 100 hours, preferably 0.5 to 20 hours. The thus resulting polymer is preferably washed with water or dilute hydrochloric acid or purified, for example, by reprecipitation.

$R^1$, $R^2$ and $R^3$ in the recurring unit (A) of the thus obtained styrene copolymer are the same as in the case of the silicon compound. That is, at least one of $R^1$ to $R^3$ is an alkenyl group. When $R^1$, $R^2$ or $R^3$ is an alkyl group, an alkyl group of $C_1$ to $C_4$ is preferable and methyl or ethyl group is more preferable. When $R^1$, $R^2$ or $R^3$ is an alkenyl group, an alkenyl group of $C_2$ to $C_4$ is preferable and vinyl or allyl group is more preferable.

The styrene copolymer of the present invention is excellent in heat resistance as well as in solubility in general organic solvents and is capable of cross-linking by a light or radiation such as electron beam. Therefore, the styrene copolymer of the present invention can be applied to not only photohardenable paints having to have heat resistance, electron beam-hardenable paints and photosensitive resins for printing plates, but also various functional polymers.

The following examples are given in order to illustrate the present invention in detail without limiting the same.

Identification of copolymers was carried out using the following instrument:

¹H-NMR Analysis

A 20 weight % solution of a sample in CDCl₃ was prepared and subjected to measurement using an NMR spectrometer of EM 360A type (60 MHz) manufactured by Varian Co. Measurement condition: 20° C.

EXAMPLE 1

Synthesis of PMS Copolymer 100 ml of tetrahydrofuran purified by distillation and 0.54 millimol of n-butyllithium were charged in a flask purged with nitrogen gas, cooled by means of a dry ice-methanol bath and stirred to prepare a solution. 5.5 ml of PMS and 5.5 ml of αMS were charged in another vessel in an atmosphere of nitrogen gas and mixed. This mixed solution was added to the former n-butyllithium solution and the polymerization reaction was initiated with agitation. After the passage of 2 hours, 2 ml of methanol was added thereto to stop the polymerization reaction. Then, the reaction solution was added to methanol to precipitate 10.3 g of PMS copolymer. The resulting PMS copolymer was dissolved in tetrahydrofuran and subjected to measurement of the molecular weight by GPC, thus obtaining $\overline{M}w = 39{,}000$ and $\overline{M}w/\overline{M}n = 1.38$. Analysis of ¹H-NMR showed that the product contained 50 mol % of PMS portion and 50 mol % of αMS. The glass transition temperature (Tg) of this PMS copolymer was 132.2° C.

Synthesis of Styrene Copolymer 2.0 g of PMS copolymer obtained by the above described procedure and 40 ml of cyclohexane were charged in a flask purged with nitrogen gas and stirred to form a solution, to which a solution of 17.4 millimol of n-butyllithium in n-hexane and 17.4 millimol of N,N,N',N'-tetramethylethylenediamine (TMEDA) were then added, and the mixture was reacted at 50° C. for 2 hours to prepare a lithiated PMS copolymer. This reaction system was then cooled to 20° C. and 40 millimol (5.4 g) of allyldimethylchlorosilane was added thereto and reacted for 2 hours. The reaction liquor was washed with water and dropwise added to methanol to precipitate 2.25 g of a white polymer. The resulting polymer was subjected to measurement of the molcular weight, thus obtaining $\overline{M}w = 44{,}700$ and $\overline{M}w/\overline{M}n = 1.42$. Tg of the polymer was 98.3° C.

The ¹H-NMR chemical shifts of the above described polymer are as follows:

¹H NMR δ (ppm): 7.12–6.14 (benzene ring), 5.74 (—CH=CH₂), 4.87, 4.82 (—CH=C$\underline{H}$₂), 2.24

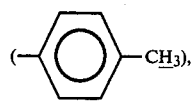

2.08–1.14

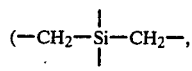

main chain), 0.48–0.00

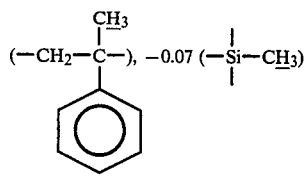

It is apparent from the integration ratio of the above described NMR analysis that the introduction ratio of allyldimethylsilyl group is 32.0 unit mol %, that of PMS portion is 18.0 unit mol % and that of αMS portion is 50.0 unit mol %, so this styrene copolymer is a random copolymer consisting of the following recurring units (A), (B) and (C):

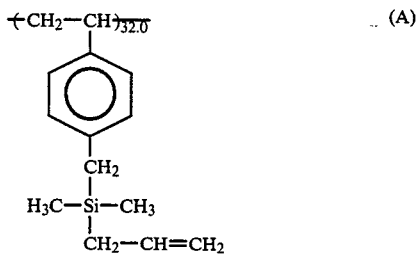

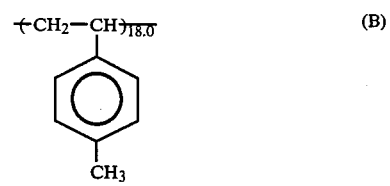

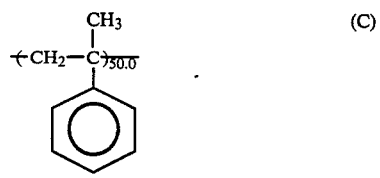

EXAMPLE 2

8.4 ml of PMS and 2.8 ml of αMS were copolymerized in an analogous manner to Example 1, thereby obtaining 10.9 g of a PMS copolymer having $\overline{M}w$ of 37,600 and $\overline{M}w/\overline{M}n$ of 1.41 and Tg of 120.6° C., and comprising 75.0 mol % of PMS portion and 25.0 mol % of αMS portion. 2.0 g of the thus obtained copolymer was subjected to lithiation in an analogous manner to Example 1 and then reacted with allydimethylchlorosilane, thus obtaining 2.2 g of a white polymer. This styrene type copolymer had $\overline{M}w$ of 47,500, $\overline{M}w/\overline{M}n$ of 1.57 and Tg of 96.0° C. and was a random copolymer consisting of the same recurring units (A), (B) and (C) as those of Example 1, i.e. $(A)_{37.9}(B)_{37.1}(C)_{25.0}$.

EXAMPLE 3

2.8 ml of PMS and 8.3 ml of αMS were copolymerized in an analogous manner to Example 1, thereby obtaining 10.4 g of a PMS copolymer having $\overline{M}w$ of 25,800, $\overline{M}w/\overline{M}n$ of 1.25 and Tg of 156.7° C. and comprising 25.0 mol % of PMS portion and 75.0 mol % of αMS portion. 2.0 g of the thus obtained copolymer was subjected to lithiation in an analogous manner to Example 1 and then reacted with allyldimethylchlorosilane, thus obtaining 2.4 g of a white polymer. This styrene copolymer had $\overline{M}w$ of 30,800, $\overline{M}w/\overline{M}n$ of 1.34 and Tg of 134.4° C. and was a random copolymer consisting of the same recurring units (A), (B) and (C) as those of Example 1, i.e. $(A)_{15.5}(B)_{9.5}(C)_{75.0}$.

EXAMPLE 4

The procedure of Example 1 was repeated except using 40 millimol (4.8 g) of vinyldimethylchlorosilane in place of the allyldimethylchlorosilane used in Synthesis of Styrene Copolymer of Example 1, thus obtaining 2.20 g of a white polymer.

The resulting polymer had $\overline{M}w$ of 42,000, $\overline{M}w/\overline{M}n$ of 1.39 and Tg of 104.0° C.

The chemical shifts of this polymer are as follows:

$^1$H NMR δ (ppm): 7.12–6.14 (benzene ring), 5.78(—C$\underline{H}$=CH$_2$), 4.99, 4.49 (—CH=C$\underline{H}_2$), 2.24

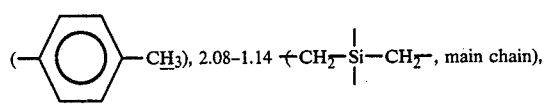

$(-⟨⟩-C\underline{H}_3)$, 2.08–1.14 $-(-CH_2-Si-CH_2-$, main chain),

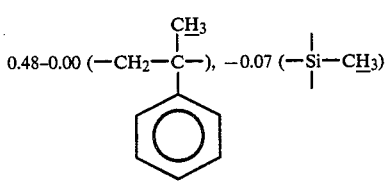

0.48–0.00 (—CH$_2$—$\overset{CH_3}{\underset{|}{C}}$—), −0.07 (—Si—C$\underline{H}_3$)

It is apparent from the integration ratio of the above described NMR analysis that this styrene copolymer is a random copolymer consisting of the following recurring units (A), (B) and (C):

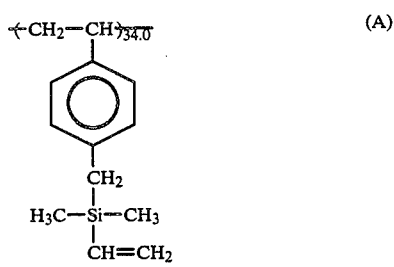

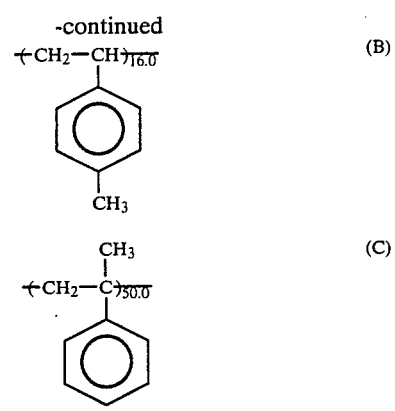

What is claimed is:

1. A styrene copolymer comprising, in combination, the following recurring units (A), (B) and (C):

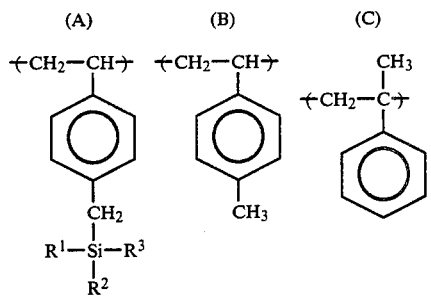

wherein $R^1$, $R^2$ and $R^3$ are, same or different, alkyl groups having 1 to 6 carbon atoms or alkenyl groups having 2 to 6 carbon atoms, at least one of $R^1$, $R^2$ and $R^3$ being an alkenyl group, and the proportions of the recurring units (A), (B) and (C) are respectively 1 to 70 mol %, 1 to 97 mol % and 2 to 98 mol %.

2. The styrene copolymer as claimed in claim 1, wherein the alkyl groups are selected from the group consisting of methyl, ethyl, n-propyl and n-butyl groups.

3. The styrene copolymer as claimed in claim 1, wherein the alkenyl groups are selected from the group consisting of vinyl, allyl, propenyl, isopropenyl and butenyl groups.

4. The styrene copolymer as claimed in claim 1, wherein the recurring units (A), (B) and (C) form a random linkage.

5. The styrene copolymer as claimed in claim 1, wherein the recurring units (A) and (B) form a random linkage and the recurring units (C) form a block linkage with the random linkage.

6. The styrene copolymer as claimed in claim 1, which further has a weight average molecular weight of several thousands to several millions and a molecular weight distribution of weight average molecular weight/number average molecular weight of at most 2.

7. The styrene copolymer as claimed in claim 1, wherein the recurring units (A), (B) and (C) are respectively 32.0 mol %, 18.0 mol % and 50.0 mol %.

8. The styrene copolymer as claimed in claim 1, wherein the proportion of the recurring units (A), (B) and (C) are respectively 37.9 mol %, 37.1 mol % and 25.0 mol %.

9. The styrene copolymer as claimed in claim 1, wherein the proportions of the recurring units (A), (B)

and (C) are respectively 15.5 mol %, 9.5 mol % and 75.0 mol %.

10. The styrene copolymer as claimed in claim 1, wherein the proportions of the recurring units (A), (B) and (C) are respectively 34.0 mol %, 16.0 mol % and 50.0 mol %.

11. A process for the production of a styrene copolymer as claimed in claim 1, which comprises bringing a random or block copolymer of p-methylstyrene and α-methylstyrene into contact with an organolithium compound to lithiate partly the p-methyl groups in the copolymer and then reacting the lithiated copolymer with a silicon compound represented by the general formula $(R^1)(R^2)(R^3)SiX$ wherein $R^1$, $R^2$ and $R^3$ are, same or different, alkyl groups having 1 to 6 carbon atoms or alkenyl groups having 2 to 6 carbon atoms, at least one of $R^1$, $R^2$ and $R^3$ being an alkenyl group, and X is a halogen atom.

12. The process as claimed in claim 11, wherein the random or block copolymer is prepared by subjecting p-methylstyrene and α-methylstyrene to a radical or living polymerization.

13. The process as claimed in claim 12, wherein the living polymerization is carried out in the presence of an initiator.

14. The process as claimed in claim 11, wherein the organolithium compound is selected from the group consisting of methyllithium, ethyllithium, n-butyllithium, sec-butyllithium, tert-butyllithium, n-pentyllithium, tert-pentyllithium, hexyllithium, octyllithium and dodecyllithium.

15. The process as claimed in claim 11, wherein the contact with an organolithium compound is carried out in the presence of a solvent inert to the organolithium compound.

16. The process as claimed in claim 15, wherein the solvent is selected from the group consisting of hexane, heptane, octane, cyclohexane, benzene, toluene, xylene, diethyl ether, dibutyl ether, tetrahydrofuran and dioxane.

* * * * *